United States Patent
Kato et al.

(10) Patent No.: US 9,965,686 B2
(45) Date of Patent: May 8, 2018

(54) IMAGE CAPTURE APPARATUS THAT IDENTIFIES OBJECT, IMAGE CAPTURE CONTROL METHOD, AND STORAGE MEDIUM

(71) Applicant: CASIO COMPUTER CO., LTD., Shibuya-ku (JP)

(72) Inventors: Hiroyuki Kato, Tokyo (JP); Masahiro Oda, Tokyo (JP); Kanako Nakano, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days. days.

(21) Appl. No.: 15/072,952

(22) Filed: Mar. 17, 2016

(65) Prior Publication Data
US 2016/0358019 A1    Dec. 8, 2016

(30) Foreign Application Priority Data
Jun. 5, 2015    (JP) ................. 2015-115269

(51) Int. Cl.
*H04N 5/228*    (2006.01)
*G06K 9/00*    (2006.01)
(Continued)

(52) U.S. Cl.
CPC ............ *G06K 9/00771* (2013.01); *G06T 7/70* (2017.01); *H04W 64/00* (2013.01); *G06T 2207/30196* (2013.01)

(58) Field of Classification Search
CPC ....... H04W 12/08; H04W 4/02; H04W 64/00; H04L 67/18; H04M 1/72572; H04M 3/42348; A61B 5/1112; A61B 5/1117
See application file for complete search history.

(56) References Cited

U.S. PATENT DOCUMENTS 6,724,421 B1 * 4/2004 Glatt ................ G08B 13/19608
                                                    348/143
6,801,637 B2 * 10/2004 Voronka .................. G06T 7/246
                                                    348/169
(Continued)

FOREIGN PATENT DOCUMENTS

JP    2002-314851    10/2002
JP    2002-344789    11/2002
(Continued)

*Primary Examiner* — Trung Diep
(74) *Attorney, Agent, or Firm* — Cozen O'Connor (57) ABSTRACT

A location obtaining unit obtains information on a location of the image capture apparatus during image; a direction obtaining unit obtains direction of an object in an image captured; a device information obtaining unit obtains information on a location of a wireless device that is included by an object during image capture; a distance obtaining unit obtains a distance of the object in the image captured from the image capture apparatus; an object location calculating unit calculates a location of the object based on the information on the location of the image capture apparatus, a direction of the object in the image, and the distance of the object from the image capture apparatus; and an object identifying unit identifies that the object is the object including the wireless device if the location of the object and the location of the wireless device are within a predetermined range.

18 Claims, 8 Drawing Sheets

(51) Int. Cl.
    *H04W 64/00*    (2009.01)
    *G06T 7/70*     (2017.01)

(56)         References Cited

U.S. PATENT DOCUMENTS 7,830,962  B1 *  11/2010  Fernandez ....... G08B 13/19608
                                                      375/240.16
    8,027,577  B2 *  9/2011   Kurosawa .............. G03B 17/00
                                                          396/49
    2015/0206012 A1 * 7/2015  Stout .................. G06K 9/00711
                                                         382/103

FOREIGN PATENT DOCUMENTS

JP          2006-195786        7/2006
    JP          2013-85200         5/2013

* cited by examiner

IMAGE CAPTURE APPARATUS THAT IDENTIFIES OBJECT, IMAGE CAPTURE CONTROL METHOD, AND STORAGE MEDIUM

This application is based on and claims the benefit of priority from Japanese Patent Application No. 2015-115269, filed on 5 Jun. 2015, the content of which is incorporated herein by reference.

BACKGROUND OF THE INVENTION

Field of the Invention

The present invention relates to an image capture apparatus that identifies an object, an image capture control method, and a storage medium.

Related Art

Conventionally, a method of using face image recognition has been known for identifying whether an individual is included in an image, upon image capture by an image capture apparatus. However, such the method has a problem of insufficient accuracy of face image recognition, and a problem of requiring registration of face images to the image capture apparatus in advance, which is undesirable in terms of privacy protection.

Japanese Unexamined Patent Application Publication No. 2013-085200 discloses a method of identifying an individual by determining whether an object that matches characteristic information is present in an image being captured, the characteristic information being stored in association with an identifier detected in a range of an angle of view (capture location) of image capture.

SUMMARY OF THE INVENTION

An aspect of an image capture apparatus according to the present invention comprises:

an image capture unit;

a first information obtaining unit that obtains information on a location of the apparatus during image capture by the image capture unit;

a second information obtaining unit that obtains direction of an object in an image captured by the image capture unit;

a third information obtaining unit that obtains information on a location of a wireless device that is included by the object during image capture by the image capture unit;

a fourth information obtaining unit that obtains a distance of the object in the image captured by the image capture unit from the apparatus;

a calculating unit that calculates a location of the object based on the information on the location of the apparatus obtained by the first information obtaining unit, the direction of the object in the image obtained by the second information obtaining unit, and the distance of the object from the apparatus obtained by the fourth information obtaining unit; and an identifying unit that identifies the object as the object including the wireless device if the location of the object calculated by the calculating unit and the location of the wireless device obtained by the third information obtaining unit are within a predetermined range.

An aspect of an image capture control method according to the present invention is the image capture control method performed in an image capture apparatus having an image capture unit, comprising:

a first information obtaining step of obtaining information on a location of the image capture apparatus during image capture by the image capture unit;

a second information obtaining step of obtaining direction of an object in an image captured by the image capture unit;

a third information obtaining step of obtaining information on a location of a wireless device that is included by the object during image capture by the image capture unit;

a fourth information obtaining step of obtaining a distance of the object in the image captured by the image capture unit from the image capture apparatus;

a calculating step of calculating a location of the object based on the information on the location of the image capture apparatus obtained in the first information obtaining step, the direction of the object in the image obtained in the second information obtaining step, and the distance of the object from the image capture apparatus obtained in the fourth information obtaining step; and an identifying step of identifying the object as the object including the wireless device if the location of the object calculated in the calculating step and the location of the wireless device obtained in the third information obtaining step are within a predetermined range.

An aspect of a storage medium according to the present invention is a non-transitory computer readable storage medium storing a program that causes a computer to implement an image capture control function, the program being executed in the image capture apparatus having an image capture unit, wherein the storage medium causes the computer to perform:

a first information obtaining function of obtaining information on a location of the image capture apparatus during image capture by the image capture unit;

a second information obtaining function of obtaining direction of an object in an image captured by the image capture unit;

a third information obtaining function of obtaining information on a location of a wireless device that is included by the object during image capture by the image capture unit;

a fourth information obtaining function of obtaining a distance of the object in the image captured by the image capture unit from the image capture apparatus;

a calculating function of calculating a location of the object based on the information on the location of the image capture apparatus obtained by the first information obtaining function, the direction of the object in the image obtained by the second information obtaining function, and the distance of the object from the image capture apparatus obtained by the fourth information obtaining function; and an identifying function of identifying the object as the object including the wireless device if the location of the object calculated by the calculating function and the location of the wireless device obtained by the third information obtaining function are within a predetermined range.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention are explained below with reference to the drawings.

Figure 1:
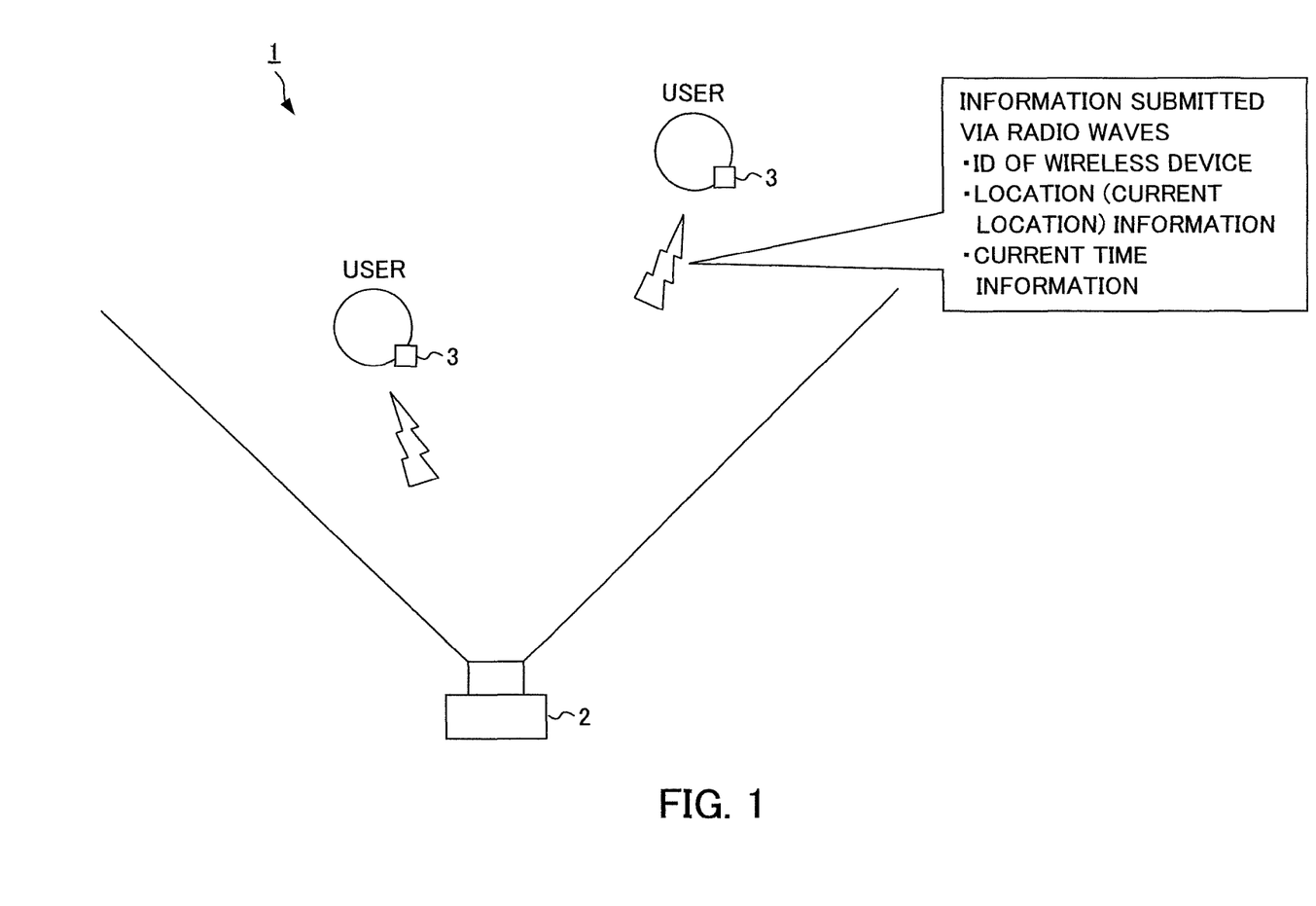
FIG. 1 is a schematic view illustrating a system configuration of an image capture system according to an embodiment of the present invention.

FIG. 1 is a schematic view illustrating a system configuration of an image capture system 1 according to an embodiment of the present invention;

The image capture system 1 is configured to include an image capture apparatus 2 and a wireless device 3 that are configured to be communicable with each other via radio communication (BLE (Bluetooth (registered trademark) Low Energy), iBeacon, etc.).

Figure 2:
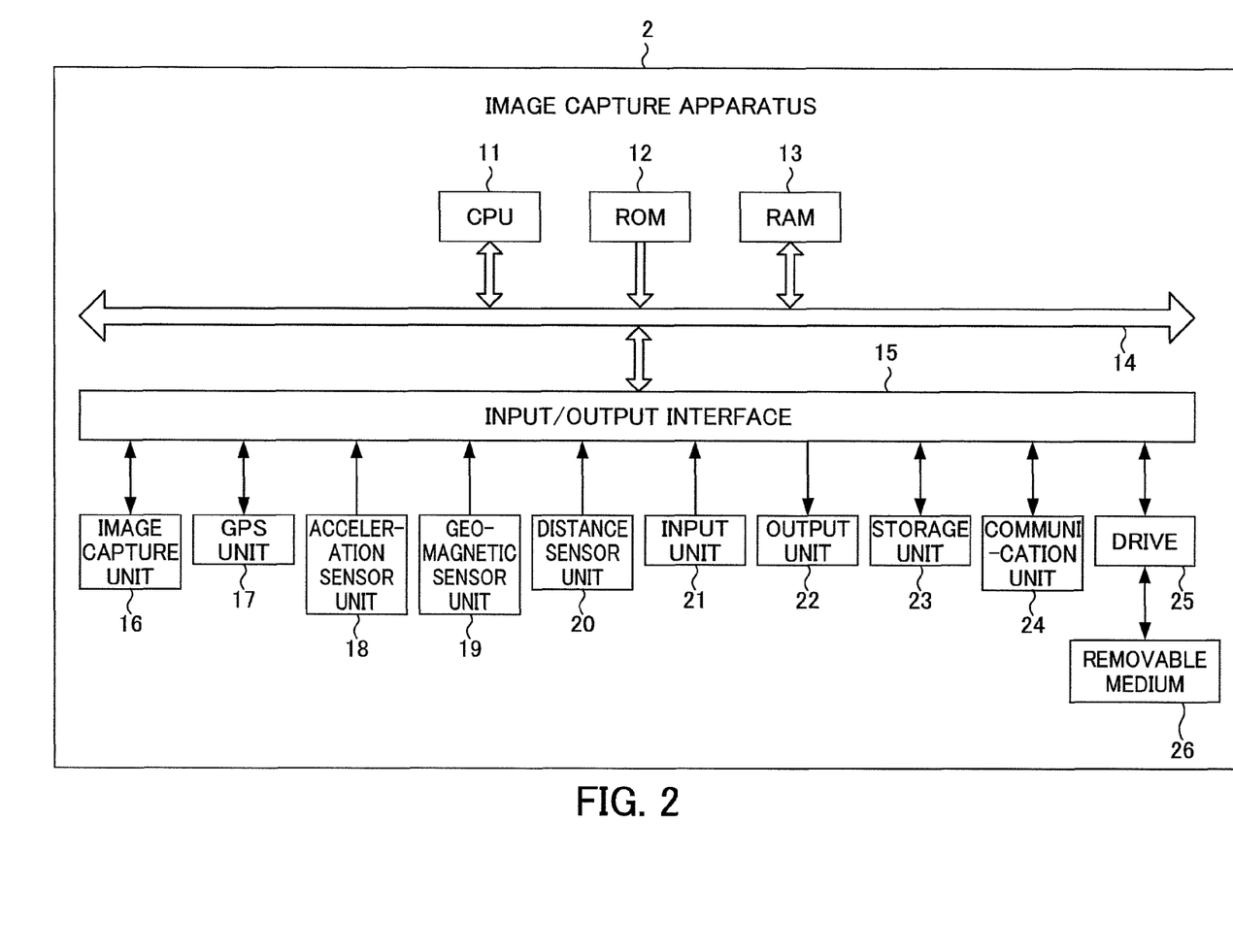
FIG. 2 is a block diagram illustrating a hardware configuration of the image capture apparatus.

FIG. 2 is a block diagram illustrating a hardware configuration of the image capture apparatus 2.

The image capture apparatus 2 is configured as, for example, a digital camera.

The image capture apparatus 2 includes a CPU (Central Processing Unit) 11, ROM (Read Only Memory) 12, RAM (Random Access Memory) 13, a bus 14, an input/output interface 15, an image capture unit 16, an GPS (Global Positioning System) unit 17, an acceleration sensor unit 18, a geomagnetic sensor unit 19, a distance sensor unit 20, an input unit 21, an output unit 22, a storing unit 23, a communication unit 24, and a drive 25.

The CPU 11 executes various processing according to a program that is recorded in the ROM 12, or a program that is loaded from the storing unit 23 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. To the input/output interface 15, the image capture unit 16, the GPS unit 17, the acceleration sensor unit 18, the geomagnetic sensor unit 19, the distance sensor unit 20, the input unit 21, the output unit 22, the storing unit 23, the communication unit 24, and the drive 25 are connected.

The image capture unit 16 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of an object in the optoelectronic conversion device. The optoelectronic conversion device optoelectronically converts (i.e. captures) the image of the object, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such the output signal of the image capture unit 16 is hereinafter referred to as "data of a captured image". Data of the captured image is supplied to the CPU 11, and the like as appropriate.

The GPS unit 17 detects a location (latitude, longitude, altitude) of the image capture apparatus 2 and current time indicated by the GPS, based on a GPS signal received from a GPS satellite.

The acceleration sensor unit 18 detects respective three-axis acceleration in the image capture apparatus 2.

The geomagnetic sensor unit 19 detects an orientation of geomagnetic field.

The distance sensor unit 20 is configured with a range imagery sensor or a device such as a stereo camera, and detects a distance from the image capture apparatus 2 to an object. Here, the distance sensor unit 20 detects distances to objects at a plurality of locations within an angle of view of the image capture apparatus 2. It should be noted that, other than detection by the distance sensor unit 20, the distance to the object can also be detected by using a ranging function for the AF (Auto Focus) control of the image capture unit 16.

The input unit 21 is configured by various buttons and the like, and inputs a variety of information in accordance with instruction operations by a user.

The output unit 22 is configured by a display unit, a speaker, and the like, and outputs images and sound.

The storing unit 23 is configured by a hard disk, DRAM (Dynamic Random Access Memory) or the like, and stores data of various images.

The communication unit 24 controls communication with other devices (not illustrated) via networks including the Internet. The communication unit 24 controls communication with the wireless device 3, by radio communication such as BLE and iBeacon.

A removable medium 26 composed of a magnetic disk, an optical disk, a magneto-optical disk, semiconductor memory or the like is installed in the drive 25, as appropriate. Programs that are read via the drive 25 from the removable medium 26 are installed in the storing unit 23, as necessary. Similarly to the storing unit 23, the removable medium 26 can also store a variety of data such as the image data stored in the storing unit 23.

Figure 3:
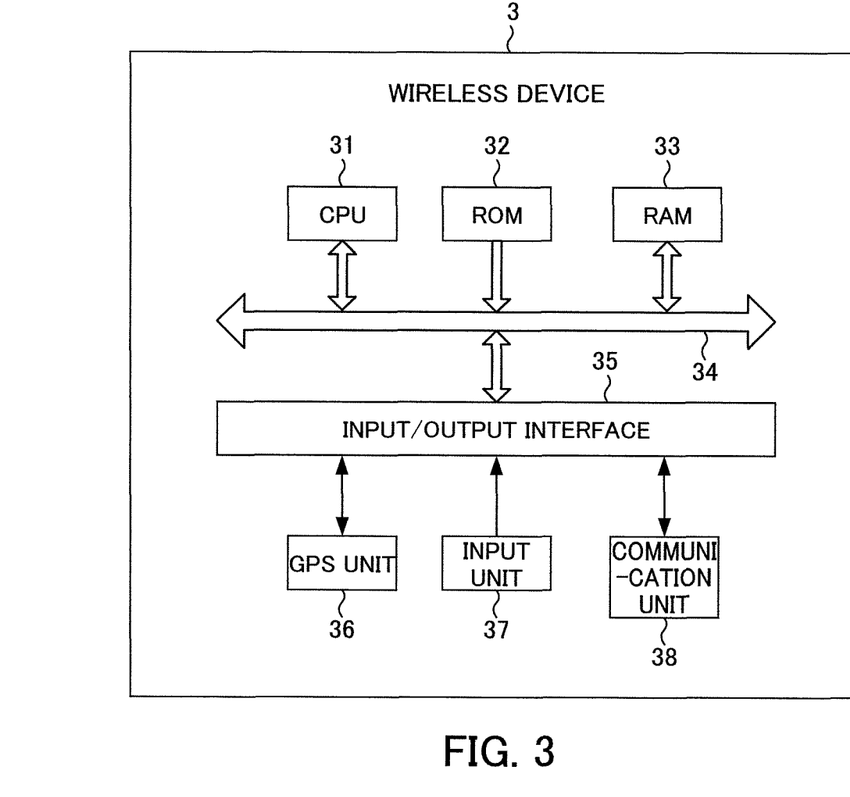
FIG. 3 is a block diagram showing a hardware configuration of a wireless device.

FIG. 3 is a block diagram showing a hardware configuration of the wireless device 3.

The wireless device 3 is provided with a CPU 31, ROM 31, RAM 33, a bus 34, an input/output interface 35, a GPS unit 36, an input unit 37, and a communication unit 38.

These functional units have similar configurations to the functional units of the image capture apparatus 2 illustrated in FIG. 2.

Figure 4:
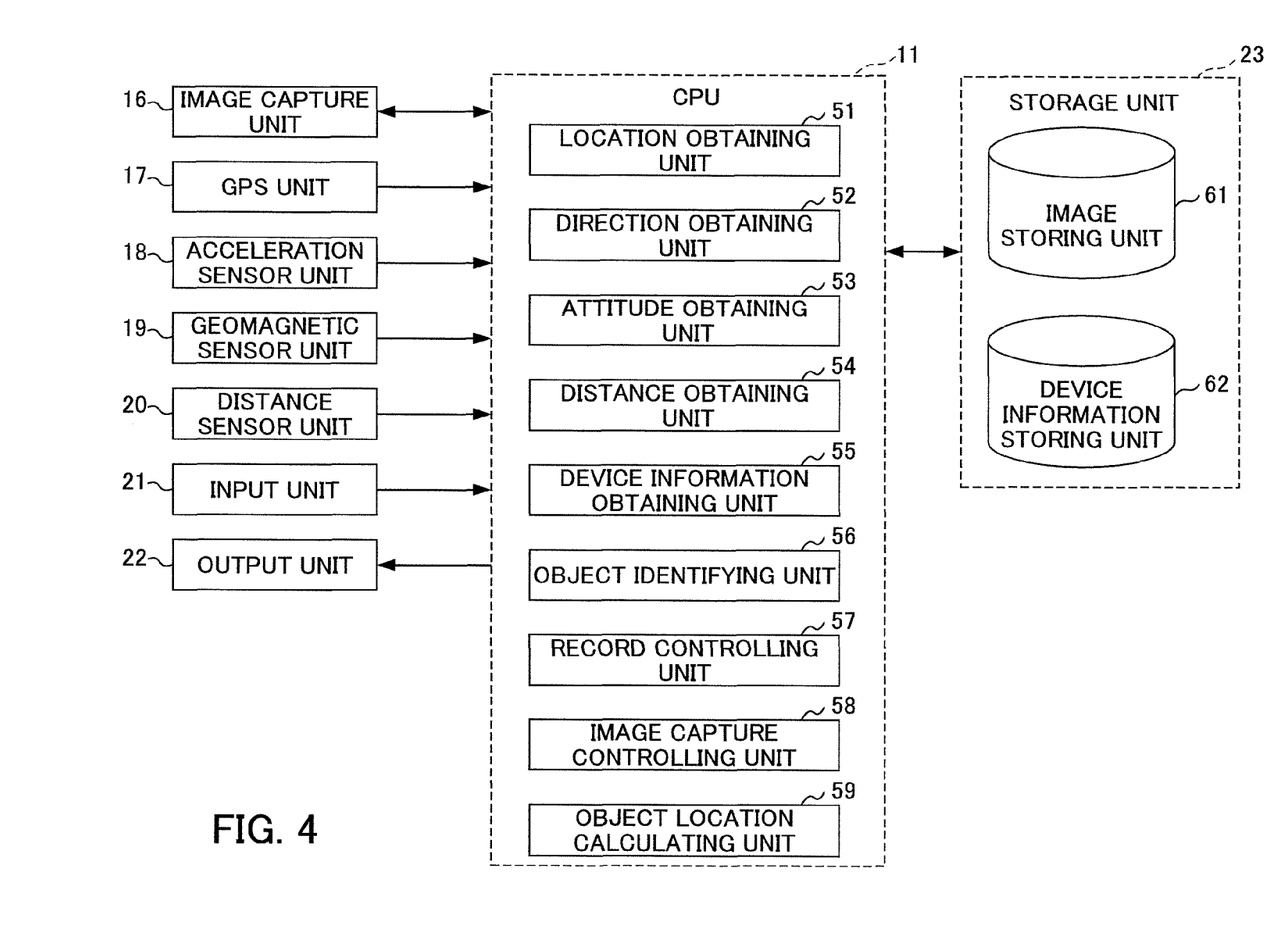
FIG. 4 is a functional block diagram showing a functional configuration for executing object identifying processing, among the functional configurations of the image capture apparatus.

FIG. 4 is a functional block diagram showing a functional configuration for executing object identifying processing, among the functional configurations of the image capture apparatus 2.

The object identifying processing is processing of identifying a captured object based on the direction and distance of an object detected by the image capture apparatus 2, and a location of the wireless device 3 submitted from the wireless device 3. In a case in which the object identifying processing is performed in the image capture apparatus 2, processing of obtaining the location of the wireless device 3 at the predetermined time interval (for example, every second) and processing of submitting the location thus obtained to the image capture apparatus 2 along with information indicating communication time are repeated in the wireless device 3.

Upon performing the object identifying processing, as illustrated in FIG. 4, a location obtaining unit 51, a direction obtaining unit 52, an attitude obtaining unit 53, a distance obtaining unit 54, an device information obtaining unit 55, an object identifying unit 56, a record controlling unit 57, a capture controlling unit 58, and an object location calculating unit 59 function in the CPU 11.

In addition, a region of the storing unit 23 is provided with an image storing unit 61 and a device information storing unit 62.

The image storing unit 61 stores data of captured images captured by the image capture apparatus 2.

The device information storing unit 62 stores information (ID, communication time, location information and the like of the wireless device 3) regarding the wireless device 3 with which the image capture apparatus 2 had radio communication.

The location obtaining unit 51 as a first information obtaining unit obtains a location (latitude, longitude and altitude) of the image capture apparatus 2 detected by the GPS unit 17.

The direction obtaining unit 52 as a second information obtaining unit obtains a direction of the image capture apparatus 2 based on an orientation of geomagnetic field detected by the geomagnetic sensor unit 19.

The attitude obtaining unit 53 obtains attitude of the image capture apparatus 2 based on three-axis acceleration in the image capture apparatus 2 detected by the acceleration sensor unit 18. In the present embodiment, the attitude obtaining unit 53 detects an elevation angle or a depression angle of the image capture device 2 based on a horizontal direction.

The distance obtaining unit 54 as a fourth information obtaining unit obtains a distance on a land surface (a surface distance) to the object, based on a distance detected by the distance sensor unit 20.

Figure 5:
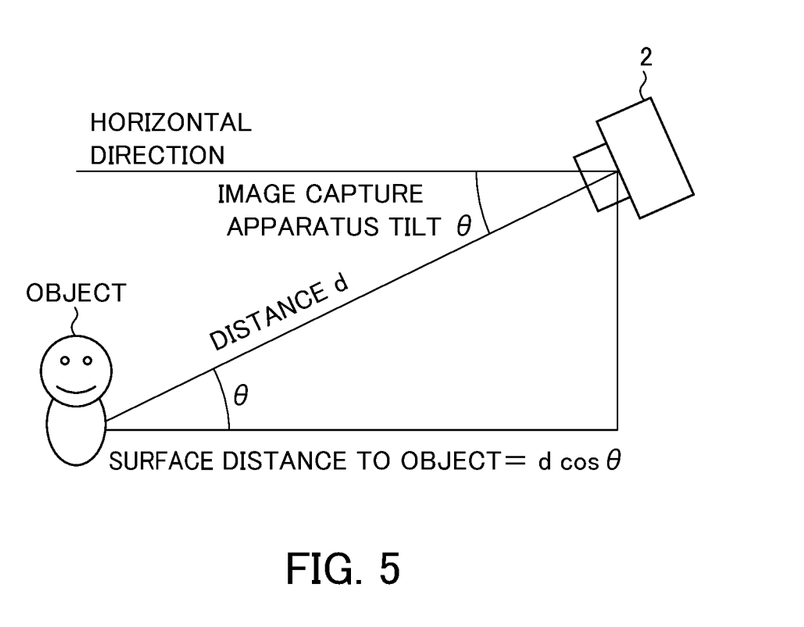
FIG. 5 is a schematic view showing a surface distance to the object.

FIG. 5 is a schematic view showing the surface distance to the object.

As illustrated in FIG. 5, the distance obtaining unit 54 obtains a distance (surface distance) to the object by obtaining a cosine of the depression angle (or the elevation angle) θ of the image capture apparatus 2 with respect to the distance d to the object detected by the distance sensor unit 20 (distance to the object=d cos θ).

Again in FIG. 4, the device information obtaining unit 55 as a third information obtaining unit obtains information regarding the wireless device 3 (ID, communication time, location information and the like of the wireless device 3) via the communication unit 24.

The object location calculating unit 59 as a calculating unit calculates the direction of the object based on: the location, an azimuth angle, and the elevation angle or the depression angle of the image capture apparatus 2 during image capture in the image capture apparatus 2; information on an angle of view of the image capture apparatus 2 (focal length of lens, etc.); and a location of the image of the object in the captured image, and calculates the location of the object based on: the direction thus calculated; and the distance (the surface distance) obtained by the distance obtaining unit 54.

The object identifying unit 56 as an identifying unit determines whether the location of the object calculated by the object location calculating unit 59 matches the information regarding the wireless device 3 (location of the wireless device 3) obtained by the device information obtaining unit 55 (specifically, it is determined whether the location of the object is included within a specified range from the location of the wireless device 3), and, if there is a match, identifies the object captured in the captured image as an object with the wireless device 3 (an owner of the wireless device 3).

This allows determination of a state in which the object with the wireless device 3 is not captured in the captured image due to shielding by a shield or the like.

Figure 6:
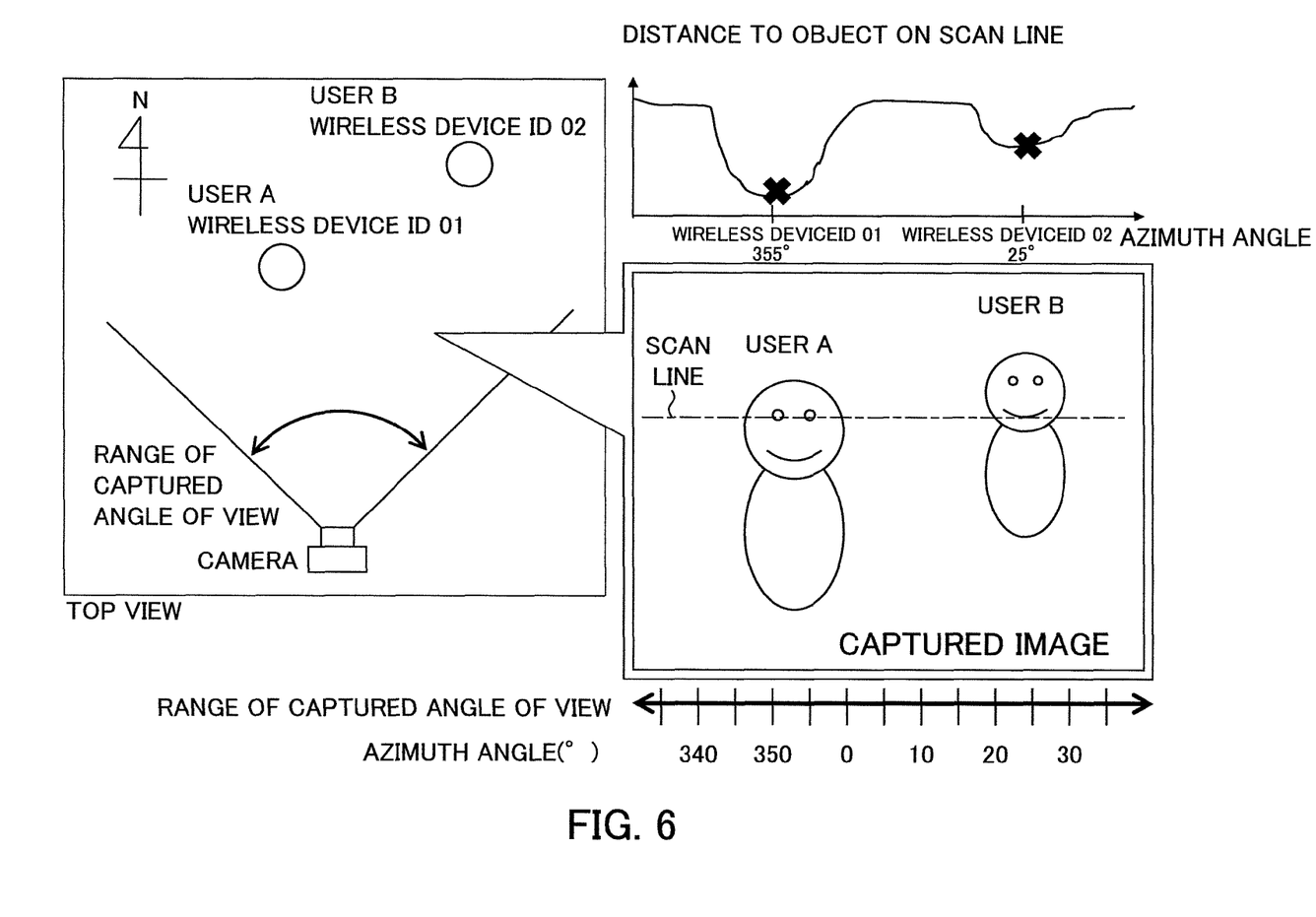
FIG. 6 is a schematic view showing a state in which the object with the wireless device is captured in a captured image without being shielded.

FIG. 6 is a schematic view showing a state in which the object with the wireless device 3 is captured in the captured image without being shielded.

As illustrated in FIG. 6, in a case in which the object with the wireless device 3 is included within a range of the captured image of the image capture apparatus 2, the direction of the object is calculated based on: the location, the azimuth angel, and the elevation angle or the depression angle of the image capture apparatus 2 during image capture; information on the angle of view of the image capture apparatus 2 (focal length of lens, etc.); and the location of the image of the object in the captured image, and the location of the object is calculated based on: the direction thus calculated; and the distance (the surface distance) obtained by the distance obtaining unit 54. And then, it is determined whether the location of the object thus calculated matches the information regarding the wireless device 3 (location of the wireless device 3), and, if there is a match, the object captured in the captured image is identified as the object with the wireless device 3 (the owner of the wireless device 3). In the example illustrated in FIG. 6, as to distances to a user A and a user B who are objects, since the distances (surface distances) to the objects obtained by the distance obtaining unit 54 match the distances calculated from the location of the wireless device 3 and the location of the image capture apparatus 2, the user A and the user B are determined to be captured in the captured image.

Figure 7:
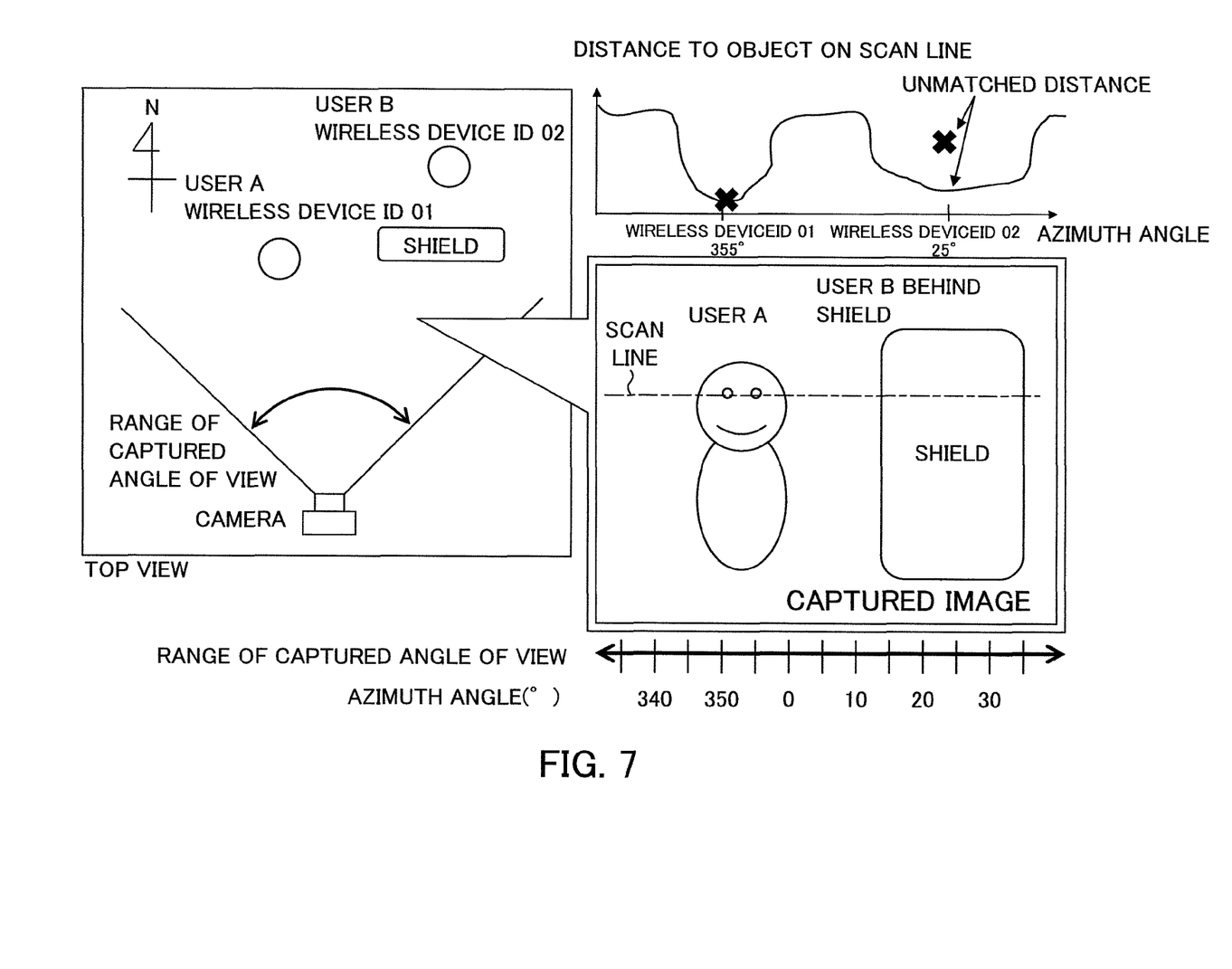
FIG. 7 is a schematic view showing a state in which the object with the wireless device is partially shielded in a captured image.

FIG. 7 is a schematic view showing a state in which the object with the wireless device 3 is partially shielded in a captured image.

As illustrated in FIG. 7, in a case in which the object with the wireless device 3 is included within a range of the captured image of the image capture apparatus 2, the direction of the object is calculated based on: the location, the azimuth angel, and the elevation angle or the depression angle of the image capture apparatus 2 during image capture; information on the angle of view of the image capture apparatus 2 (the focal length of lens, etc.); and the location of the image of the object in the captured image, and the location of the object is calculated based on: the direction thus calculated; and the distance (the surface distance) obtained by the distance obtaining unit 54. And then, it is determined whether the location of the object thus calculated matches the information regarding the wireless device 3 (the location of the wireless device 3), and, if there is a match, the object captured in the captured image is identified as the object with the wireless device 3 (the owner of the wireless device 3). In the example illustrated in FIG. 7, as to distance to a user A who is the object, since the distance (the surface distances) to the object obtained by the distance obtaining unit 54 matches the distance calculated from the location of the wireless device 3 and the location of the image capture apparatus 2, the user A is determined to be captured in the captured image. On the other hand, as to distance to a user B, since the distance (the surface distances) to the object (shield) obtained by the distance obtaining unit 54 does not match the distance calculated from the location of the wireless device 3 and the location of the image capture apparatus 2, the user B is determined not to be captured in the captured image.

Again in FIG. 4, the record controlling unit 57 adds information regarding the wireless device 3 (for example, ID of wireless device 3) to data of the captured image captured by the image capture apparatus 2, in a case in which the object with the wireless device 3 is identified by the object identifying unit 56. This allows the user to know that the object with the wireless device 3 is captured in the captured image. Alternatively, the record controlling unit 57 can add the location in the angle of view and the information regarding the wireless device 3 in association with each other. In such a case, in addition to knowing that the object with the wireless device 3 is captured in the captured image, one can know the object at which location is the object with the wireless device 3.

The capture controlling unit 58 controls image capture in the image capture apparatus 2 according to user settings. For example, the capture controlling unit 58 controls interval photography according to a capture interval and capture duration specified by the user.

Figure 8:
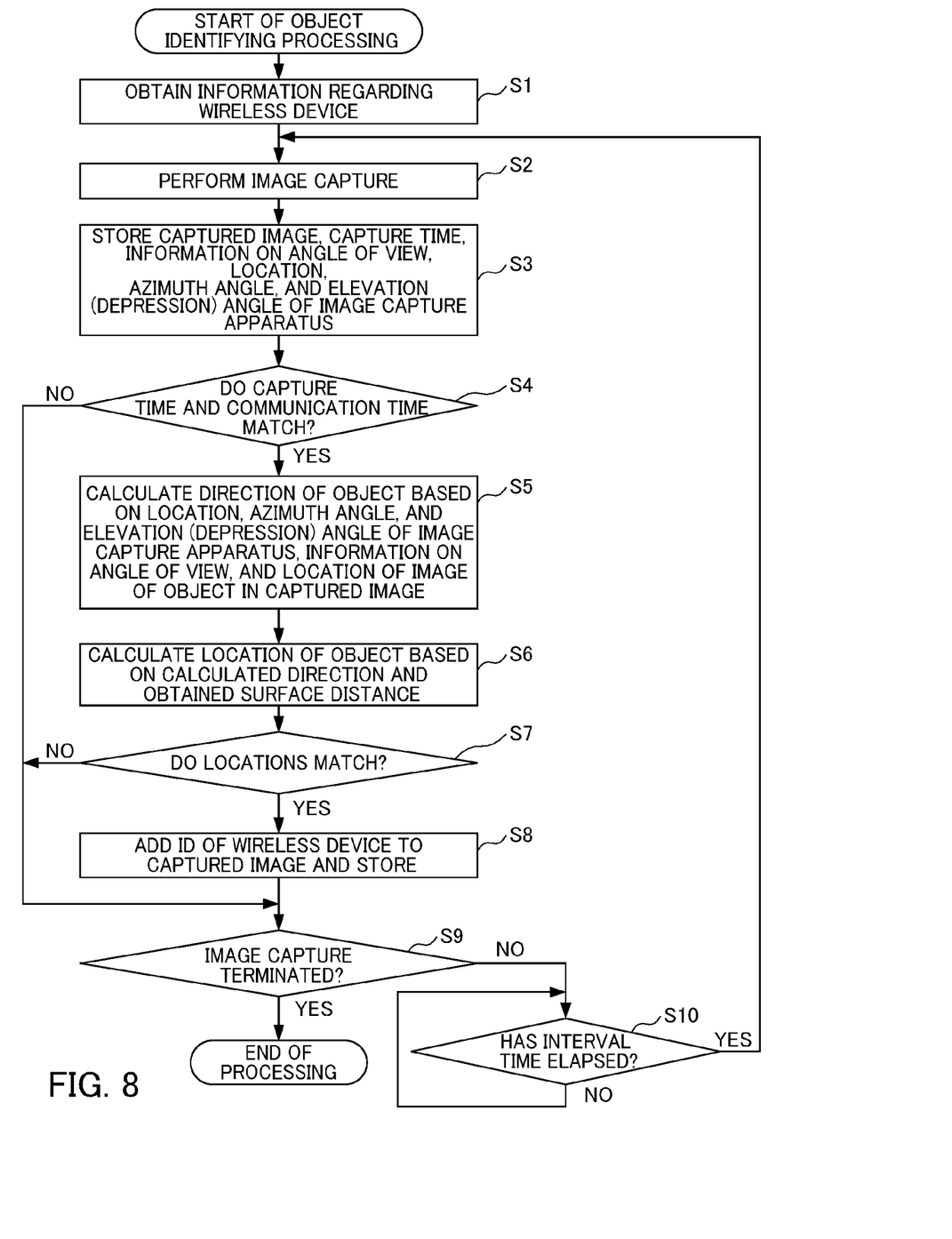
FIG. 8 is a flowchart illustrating a flow of the object identifying processing executed by the image capture apparatus of FIG. 2 having the functional configuration of FIG. 4.

FIG. 8 is a flowchart illustrating a flow of the object identifying processing executed by the image capture apparatus 2 of FIG. 2 having the functional configuration of FIG. 4.

The object identifying processing starts by the user's operation on the input unit 21 to start the object identifying processing. It should be noted that, in the present embodiment, the object identifying processing performed during interval photography is described as an example.

In Step S1, the device information obtaining unit 55 obtains information regarding the wireless device 3. The information regarding the wireless device 3 is received sequentially and stored in the device information storing unit 62.

In Step S2, the capture control unit 58 performs image capture.

In Step S3, the capture control unit 58 stores the captured image, capture time, information on the angle of view, the location of the image capture apparatus 2, the azimuth angle, and the elevation angle or the depression angle.

In Step S4, the object location calculating unit 59 determines whether the capture time matches the communication time in the information regarding the wireless device 3.

If the capture time matches the communication time in the information regarding the wireless device 3, determination in Step S4 is YES and processing proceeds to Step S5.

If the capture time does not match the communication time in the information regarding the wireless device 3, determination in Step S4 is NO and processing proceeds to Step S9.

In Step S5, the object location calculating unit 59 calculates the direction of the object based on: the location, the azimuth angle, and the elevation angle or the depression angle of the image capture apparatus 2 at the capture time matching the communication time; information on the angle of view of the image capture apparatus 2 (the focal length of lens, etc.); and the location of the image of the object in the captured image.

In Step S6, the object location calculating unit 59 calculates the location of the object based on: the direction thus calculated; and the distance (the surface distance) obtained by the distance obtaining unit 54.

In Step S7, the object identifying unit 56 determines whether the location of the object thus calculated matches the information regarding the wireless device 3 (location of the wireless device 3).

If the location of the object thus calculated matches the information regarding the wireless device 3 (location of the wireless device 3), determination in Step S6 is YES and the processing proceeds to Step S8.

If the location of the object thus calculated does not match the information regarding the wireless device 3 (location of the wireless device 3), determination in Step S7 is NO and the processing proceeds to Step S9.

In Step S8, the object identifying unit 56 adds the information regarding the wireless device 3 (here, ID of the wireless device 3) to the captured image and stores to the image storing unit 61.

In Step S9, the capture control unit 58 determines whether or not completion of image capture has been instructed.

If completion of image capture has not been instructed, determination in Step S9 is NO and the processing proceeds to Step S10.

If completion of image capture has been instructed, determination in Step S9 is YES and the object identifying processing terminates.

In Step S10, the capture control unit 58 determines whether or not the capture interval (interval time) of the interval photography has elapsed.

If the capture interval of the interval photography has not elapsed, determination in Step S10 is NO and the processing of Step S10 is repeated.

If the capture interval of the interval photography has elapsed, determination in Step S10 is YES and the processing proceeds to Step S2.

The above described processing calculates the direction of the object based on: the location, the azimuth angle, and the elevation angle or the depression angle of the image capture apparatus 2 during image capture; information on the angle of view of the image capture apparatus 2 (the focal length of lens, etc.); and the location of the image of the object in the captured image, and calculates the location of the object based on: the direction thus calculated; and the distance (the surface distance) obtained by the distance obtaining unit 54. And then, it is determined whether the location of the object thus calculated matches the information regarding the wireless device 3 (location of the wireless device 3), and, if there is a match, the object captured in the captured image is identified as the object with the wireless device 3 (the owner of the wireless device 3).

This allows determination of the state in which the object with the wireless device 3 is not captured in the captured image due to shielding by the shield or the like.

As a result, it is easier to determine upon image capture whether or not a particular individual appears in the captured image.

Since the object ID is thus added to the captured image, by specifying the ID of the wireless device 3 upon search in stored images, only images stored with the ID are returned. In other words, the user can select only images in which the user him/herself is captured.

[Modification 1]

The object identifying processing in the object identifying unit 56 according to the above described embodiment can also be the following processing.

In other words, the object location calculating unit 59 calculates the direction of the object based on: the location, the azimuth angle, and the elevation angle or the depression angle of the image capture apparatus 2 during image capture in the image capture apparatus 2; information on the angle of view of the image capture apparatus 2 (the focal length of lens, etc.); and the location of the image of the object in the captured image.

In addition, the object location calculating unit 59 calculates the direction and distance from the image capture apparatus 2 to the wireless device 3 based on the location of the image capture apparatus 2 and the information regarding the wireless device 3 (the location of the wireless device 3).

And then, the object identifying unit 56 determines whether the direction of the object thus calculated and the distance obtained by the distance obtaining unit 54 match the direction and the distance from the image capture apparatus 2 to the wireless device 3 thus calculated, and, if there is a match, the object captured in the captured image is identified as the object with the wireless device 3 (the owner of the wireless device 3).

This also allows determination of the state in which the object with the wireless device 3 is not captured in the captured image due to shielding by the shield or the like.

[Modification 2]

In the above described embodiment and modification, upon identification of the object being captured, determination is made as to whether or not the distance of the object in the captured image matches the distance to the wireless device 3 obtained from the information regarding the wireless device 3; however, the present invention is not limited thereto.

In other words, instead of determining a match between distances to the object, determination can be made as to whether or not the direction of the object in the captured image matches the direction of the wireless device 3 obtained from the information regarding the wireless device 3, to thereby determine whether the object is captured in the captured image.

This allows for identification of correspondence between the location in the captured image and the wireless device 3.

As a result, even if shielded by the shield or the like, the object being present within the angle of view can be considered to be captured, the ID of the wireless device 3 can be added to the captured image, and the object can be identified.

[Modification 3]

In the above described embodiment, even if the object cannot be visually recognized due to shielding by the shield or the like, if the user is present in the direction within the angle of view, the ID assigned to the user can be added to the captured image and can be stored. In addition, according to the user settings, existence of the user at the location shielded by the shield or the like can be indicated by displaying a message (ID displaying in a balloon, etc.).

As a result, the user can be associated with the captured image of the situation where the user was present, even if the user is not visually recognizable as the object.

The image capture apparatus 2 thus configured includes: the image capture unit 16 (the image capture unit); the location obtaining unit 51 (the first information obtaining unit); the direction obtaining unit 52 (the second information obtaining unit); the device information obtaining unit 55 (the third information obtaining unit); the distance obtaining unit 54 (the fourth information obtaining unit); the object location calculating unit 59; and the object identifying unit 56 (the identifying unit).

The location obtaining unit 51 (the first information obtaining unit) obtains information on the location of the image capture apparatus 2 during image capture by the image capture unit 16.

The direction obtaining unit 52 (the second information obtaining unit) obtains direction of the image in the image captured by the image capture unit 16 (the image capture unit).

The device information obtaining unit 55 (the third information obtaining unit) obtains information on the location of the wireless device 3 that is included by the object during image capture by the image capture unit 16 (the image capture unit).

The distance obtaining unit 54 (the fourth information obtaining unit) obtains the distance of the object in the image captured by the image capture unit 16 (the image capture unit) from the image capture apparatus 2.

The object location calculating unit 59 (the calculating unit) calculates the location of the object based on the information on the location of the image capture apparatus 2 obtained by the location obtaining unit 51 (the first information obtaining unit), the direction of the image in the image obtained by the direction obtaining unit 52 (the second information obtaining unit), and the distance of the object from the image capture apparatus 2 obtained by the distance obtaining unit 54 (the fourth information obtaining unit).

The object identifying unit 56 (the identifying unit) identifies the object as the object including the wireless device 3 if the location of the object calculated by the object location calculating unit 59 (the calculating unit) and the location of the wireless device 3 obtained by the device information obtaining unit 55 (the third information obtaining unit) are within a predetermined range.

This allows for identification of the object including the wireless device 3 based on the match of distances of the object.

As a result, the object being present in the angle of view can be identified, and it is easier to determine upon image capture whether or not the particular individual appears in the captured image.

The image capture apparatus 2 further includes the attitude obtaining unit 53.

The attitude obtaining unit 53 obtains any one of the elevation angle and the depression angle of the image capture apparatus 2.

The direction obtaining unit 52 obtains the direction of the object.

The direction of the object in the image is represented by the azimuth angle, and any one of the elevation angle and the depression angle.

As a result, appropriate identification of the object is possible even if the image capture apparatus 2 has captured the image with the elevation angle or the depression angle.

In addition, the object location calculating unit 59 (the calculating unit) calculates the location of the object based on the direction of the object in the image and the location of the image of the object in the image captured by the image capture unit 16 (the image capture unit).

This allows calculation of location of the object based on information detected in the image capture apparatus 2.

Furthermore, the wireless device 3 includes the identifying number being set that allows for identification of the wireless device 3.

The image capture apparatus 2 stores the captured image including the object thus identified along with the identifying number.

This allows for identification of the object with the wireless device 3 (the owner of the wireless device 3) in the captured image and storage thereof.

Moreover, the object identifying unit 56 (the identifying unit) identifies the object as the object shielded by the shield if the location of the object calculated by the object location calculating unit 59 (the calculating unit) and the location of the wireless device 3 obtained by the device information obtaining unit 55 (the third information obtaining unit) are out of the predetermined range.

As a result, the user can be associated with the captured image of the situation where the user was present, even if the user is not visually recognizable as the object.

It should be noted that the present invention is not to be limited to the aforementioned embodiment, and that modifications, improvements, etc. within a scope that can achieve the object of the present invention are also included in the present invention.

In the above described embodiment, the object identifying processing is described to be performed in the image capture apparatus 2; however, the present invention is not limited thereto.

In other words, the object identifying processing can also be performed by an information processing apparatus and the like without the image capture function, by using the captured image and information obtained in the image capture apparatus 2 during image capture.

In addition, in the above described embodiment, the object identifying processing is described to be performed after capture of the image; however, the present invention is not limited thereto.

In other words, the object identifying processing can also be performed during capture of the image, and, at the completion of the capture, the ID of the wireless device 3 of the object captured in the image can then be added to the captured image.

In the above described embodiment, the image capture device 2 to which the present invention is applied is the digital camera; however, the present invention is not particularly limited thereto.

For example, the present invention can be applied to any electronic apparatus in general with an information processing function. More specifically, for example, the present invention can be applied to a laptop personal computer, a printer, a television receiver, a video camera, a portable navigation device, a cell phone device, a smartphone, a portable gaming device, and the like.

The processing sequence described above can be executed by hardware, and can also be executed by software.

In other words, the hardware configurations of FIG. 4 are merely illustrative examples, and the present invention is not particularly limited thereto. More specifically, the types of functional blocks employed to realize the above-described functions are not particularly limited to the examples shown in FIG. 4, so long as the image capture apparatus 2 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 of FIG. 1 distributed separately from the device main body for supplying the program to the user, but also can be constituted by a storage medium or the like supplied to the user in a state incorporated in the device main body in advance. The removable medium 26 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) disk or the like. The magnetic optical disk is composed of an MD (Mini-Disk) or the like. The storage medium supplied to the user in a state incorporated in the device main body in advance may include, for example, the ROM 12 shown in FIG. 2, a hard disk included in the storing unit 23 shown in FIG. 2 or the like, in which the program is recorded.

It should be noted that, in the present specification, the steps describing the program recorded in the storage medium include not only the processing executed in a time series following this order, but also processing executed in parallel or individually, which is not necessarily executed in the time series.

In addition, in the present specification, a term system shall mean a general device configured from a plurality of devices, a plurality of circuits, and the like.

The embodiments of the present invention described above are only illustrative, and are not intended to limit the technical scope of the present invention. The present invention can assume various other embodiments. Additionally, it is possible to make various modifications thereto such as omissions or replacements within a scope not departing from the spirit of the present invention. Such embodiments and modifications are included in the scope of the invention and the summary described in the present specification, and are included in the invention recited in the claims as well as the equivalent scope thereof.

What is claimed is:
1. An image capture apparatus comprising:
an image capture unit;
a first information obtaining unit that obtains information on a location of the apparatus during image capture by the image capture unit;

a second information obtaining unit that obtains direction of an object in an image captured by the image capture unit;

a third information obtaining unit that obtains information on a location of a wireless device that is included by the object during image capture by the image capture unit;

a fourth information obtaining unit that obtains a distance of the object in the image captured by the image capture unit from the apparatus;

a calculating unit that calculates a location of the object based on the information on the location of the apparatus obtained by the first information obtaining unit, the direction of the object in the image obtained by the second information obtaining unit, and the distance of the object from the apparatus obtained by the fourth information obtaining unit; and an identifying unit that identifies the object as the object including the wireless device if the location of the object calculated by the calculating unit and the location of the wireless device obtained by the third information obtaining unit are within a predetermined range.

2. The image capture apparatus according to claim 1, wherein the direction of the object in the image captured by the second information obtaining unit is represented by an azimuth angle, and any one of an elevation angle and a depression angle.

3. The image capture apparatus according to claim 1, wherein the calculating unit calculates the location of the object based on: the direction of the object in the image; the location of the object in the image captured by the image capture unit; and information on an angle of view.

4. The image capture apparatus according to claim 1, wherein the wireless device includes an identifying number that allows for identification of the wireless device; and the apparatus stores the image including the object that is identified along with the identifying number.

5. The image capture apparatus according to claim 1, wherein the identifying unit identifies the object as an object that is shielded by a shield if the location of the object calculated by the calculating unit and the location of the wireless device obtained by the third information obtaining unit are not within the predetermined range.

6. The image capture apparatus according to claim 1, wherein the first information obtaining unit includes a GPS unit; and wherein the first information obtaining unit detects a location information including latitude, longitude and altitude of the image capture apparatus and current time during image capture by the image capture unit based on a GPS signal received from a GPS satellite.

7. The image capture apparatus according to claim 1, wherein the second information obtaining unit includes a geomagnetic sensor unit; and wherein the second information obtaining unit obtains an azimuth of the image capture apparatus during image capture by the image capture unit based on an orientation of geomagnetic field detected by the geomagnetic sensor unit.

8. The image capture apparatus according to claim 1, wherein the second information obtaining unit includes an acceleration sensor unit; and wherein the second information obtaining unit obtains attitude of the image capture apparatus during image capture by the image capture unit based on three-axis acceleration in the image capture apparatus detected by the acceleration sensor unit.

9. The image capture apparatus according to claim 1, wherein the third information obtaining unit includes a communication unit; and wherein the third information obtaining unit obtains information regarding the wireless device including an ID, communication time, location information of the wireless device via the communication unit.

10. The image capture apparatus according to claim 1, wherein the fourth information obtaining unit includes a distance sensor unit; and wherein the fourth information obtaining unit detects a distance from the image capture apparatus to the object during image capture by the image capture unit for a plurality of the subjects within an angle of view of the image capture apparatus.

11. The image capture apparatus according to claim 1, wherein the distance sensor unit is configured with a ranging sensor which realizes Auto Focus control of the image capture unit, a range imagery sensor or a stereo camera.

12. The image capture apparatus according to claim 1, wherein the fourth information obtaining unit includes a distance sensor unit; and wherein the fourth information obtaining unit obtains a surface distance from the image capture apparatus to the object based on a distance from the image capture apparatus to the object of the image captured by the image capture unit and the direction of the object in the image captured by the second information obtaining unit.

13. The image capture apparatus according to claim 12, wherein the fourth information obtaining unit obtains the surface distance to the object d cos θ based on the distance d to the object detected by the distance sensor unit and a cosine of the depression angle or an elevation angle θ of the image capture apparatus.

14. The image capture apparatus according to claim 1, further comprising:

a storing unit that stores data of the image; and a record controlling unit that controls the storing unit;

wherein the record controlling unit, in a case in which the object with the wireless device is identified by the identifying unit, adds information regarding the wireless device including ID of wireless device and a location in the angle of view to data of the captured image captured by the image capture apparatus and stores the data of the captured image in the storing unit.

15. An image capture control method performed in an image capture apparatus having an image capture unit, comprising:

a first information obtaining step of obtaining information on a location of the image capture apparatus during image capture by the image capture unit;

a second information obtaining step of obtaining direction of an object in an image captured by the image capture unit;

a third information obtaining step of obtaining information on a location of a wireless device that is included by the object during image capture by the image capture unit;

a fourth information obtaining step of obtaining a distance of the object in the image captured by the image capture unit from the image capture apparatus;

a calculating step of calculating a location of the object based on the information on the location of the image capture apparatus obtained in the first information obtaining step, the direction of the object in the image obtained in the second information obtaining step, and the distance of the object from the image capture apparatus obtained in the fourth information obtaining step; and an identifying step of identifying the object as the object including the wireless device if the location of the object calculated in the calculating step and the location of the wireless device obtained in the third information obtaining step are within a predetermined range.

16. The image capture control method according to claim 15, wherein the identifying step identifies that the object is an object that is shielded by a shield if the location of the object calculated in the calculating step and the location of the wireless device obtained in the third information obtaining step are not within the predetermined range.

17. A non-transitory computer readable storage medium storing a program that causes a computer to implement an image capture control function, the program being executed in the image capture apparatus having an image capture unit, wherein the storage medium causes the computer to perform:

a first information obtaining function of obtaining information on a location of the image capture apparatus during image capture by the image capture unit;

a second information obtaining function of obtaining direction of an object in an image captured by the image capture unit;

a third information obtaining function of obtaining information on a location of a wireless device that is included by the object during image capture by the image capture unit;

a fourth information obtaining function of obtaining a distance of the object in the image captured by the image capture unit from the image capture apparatus;

a calculating function of calculating a location of the object based on the information on the location of the image capture apparatus obtained by the first information obtaining function, the direction of the object in the image obtained by the second information obtaining function, and the distance of the object from the image capture apparatus obtained by the fourth information obtaining function; and an identifying function of identifying the object as the object including the wireless device if the location of the object calculated by the calculating function and the location of the wireless device obtained by the third information obtaining function are within a predetermined range.

18. The storage medium according to claim 17, wherein the identifying function identifies the object as an object that is shielded by a shield if the location of the object calculated by the calculating function and the location of the wireless device obtained by the third information obtaining function are not within the predetermined range.

* * * * *